US008233911B2

(12) United States Patent
Charbit et al.

(10) Patent No.: US 8,233,911 B2
(45) Date of Patent: Jul. 31, 2012

(54) METHOD AND APPARATUS FOR ESTIMATING A POSITION OF A NODE IN A COMMUNICATIONS NETWORK

(75) Inventors: Gilles Charbit, Farnborough (GB); Alberto Escolar-Piedras, Oulu (FI)

(73) Assignee: Nokia Corporation, Espoo (FI)

( * ) Notice: Subject to any disclaimer, the term of this patent is extended or adjusted under 35 U.S.C. 154(b) by 413 days.

(21) Appl. No.: 12/639,988

(22) Filed: Dec. 16, 2009

(65) Prior Publication Data
US 2011/0143770 A1   Jun. 16, 2011

(51) Int. Cl.
*H04W 24/00* (2009.01)
(52) U.S. Cl. ............... 455/456.1; 455/422.1; 455/67.11; 455/404.2; 342/357.31
(58) Field of Classification Search ............... 455/456.1, 455/456, 67.11, 422.1; 342/457, 31
See application file for complete search history.

(56) References Cited

U.S. PATENT DOCUMENTS

| | | | | |
|---|---|---|---|---|
| 6,327,474 | B1 * | 12/2001 | Ruutu et al. ............... | 455/456.1 |
| 6,484,034 | B1 * | 11/2002 | Tsunehara et al. .......... | 455/456.6 |
| 6,901,264 | B2 * | 5/2005 | Myr ............................ | 455/456.5 |
| 7,155,237 | B2 * | 12/2006 | Porcino ...................... | 455/456.1 |
| 7,636,061 | B1 * | 12/2009 | Thomas et al. .............. | 342/464 |
| 7,702,338 | B2 * | 4/2010 | Wengler et al. ............. | 455/456.1 |
| 7,764,231 | B1 * | 7/2010 | Karr et al. ................... | 342/457 |
| 2002/0086682 | A1 * | 7/2002 | Naghian ...................... | 455/456 |
| 2010/0279707 | A1 * | 11/2010 | Fischer et al. .............. | 455/456.1 |
| 2010/0311437 | A1 * | 12/2010 | Palanki et al. ............. | 455/456.1 |
| 2010/0323683 | A1 * | 12/2010 | Kazmi et al. ............... | 455/422.1 |
| 2011/0039577 | A1 * | 2/2011 | Stern-Berkowitz et al. .......................... | 455/456.1 |
| 2011/0105144 | A1 * | 5/2011 | Siomina et al. ............ | 455/456.1 |

FOREIGN PATENT DOCUMENTS

| WO | WO 9727711 A1 * | 7/1997 |
|---|---|---|
| WO | WO 2010064969 A1 * | 6/2010 |

OTHER PUBLICATIONS

Karri Ranta-Aho, "UE Positioning in LTE," Jun. 15, 2009, pp. 1-20, Nokia Siemens Networks.
"PRS Pattern Design," 3GPP TSG RAN WG1 #57bis, R1-092963, Qualcomm Europe, Jun. 29-Jul. 3, 2009, pp. 1-3, Los Angeles, CA, USA.

(Continued)

*Primary Examiner* — Kamran Afshar
*Assistant Examiner* — Mong-Thuy Tran
(74) *Attorney, Agent, or Firm* — Squire Sanders (US) LLP

(57) ABSTRACT

A method and apparatus are provided for timed estimation-based positioning of a user equipment in LTE systems. The method includes estimating, by a mobile node, a plurality of reference signal time differences (RSTD) between the mobile node and a network node. The plurality of RSTD estimates define a first correlator. The method further includes determining a second correlator of RSTD estimates, and defining the second correlator with the first correlator based on a mean of the plurality of RSTD estimates. Further, the method includes determining a distribution of the plurality of RSTD estimates, and grouping clusters of RSTD estimates in the distribution. Additionally, the method includes selecting a cluster from the clusters of RSTD estimates. The cluster includes RSTD estimates closest to a center of the second correlator. The cluster is transmitted, by the mobile node, to the network node for positioning the mobile node in a communications network.

22 Claims, 7 Drawing Sheets

OTHER PUBLICATIONS

"LS on Assistance Information for OTDOA Positioning Support for LTE," 3GPP TSG RAN WG1 Meeting #58, R1-093729, Rel-9, Aug. 24-28, 2009, pp. 1-3, Shenzhen, China.

"WF on RAN1 Concept for OTDOA," R1-092213, Ericsson, Alcatel-Lucent, Nokia, Nokia Siemens Networks, Qualcomm Europe, LG, Samsung, Huawei, Motorola, Pantech & Curitel, May 9, 2009, pp. 1-7.

"On OTDOA Method for LTE Positioning," 3GPP TSG RAN WG1 #56, R1-090918, Ericsson, Feb. 9-13, 2009, pp. 1-6, Athens, Greece.

"On OTDOA in LTE," 3GPP TSG RAN WG1 #55bis, R1-090353, Qualcomm Europe, Jan. 12-19, 2009, pp. 1-8, Ljubljana, Slovenia.

"Analysis of UE Subframe Timing Offset Measurement Sensitivity to OTDOA Performance," 3GPP TSG RAN WG1 #57bis, R1-092307, Alcatel-Lucent, Jun. 29-Jul. 3, 2009, pp. 1-5, Los Angeles, CA, USA.

"Updated Results for OTDOA Using MBSFN and Normal Subframes," 3GPP TSG RAN1 #57bis, R1-092630, Motorola, Jun. 29-Jul. 3, 2009, pp. 1-5, Los Angeles, CA, USA.

"Evolved Universal Terrestrial Radio Access (E-UTRA) and Evolved Universal Terrestrial Radio Access Network (E-UTRAN)," 3GPP TS 36.300 V9.1.0 (Sep. 2009), Technical Specification Group Radio Access Network, Overall Description, Stage 2, Release 9, Sep. 2009, pp. 1-165, Valbonne, France.

* cited by examiner

METHOD AND APPARATUS FOR ESTIMATING A POSITION OF A NODE IN A COMMUNICATIONS NETWORK

BACKGROUND

1. Field

Embodiments of the invention generally relate to communications networks and particularly to wireless telecommunications networks, for example, the Universal Mobile Telecommunications System (UMTS), the Global System for Mobile Communications (GSM), the Universal Terrestrial Radio Access Network (UTRAN), the GSM/Edge Radio Access Network (GERAN), Long Term Evolution (LTE), and Evolved UTRAN (E-UTRAN). More particularly, embodiments of the invention relate to methods, apparatuses, computer programs, and a system for timed estimation-based positioning of a user equipment (UE) in LTE systems.

2. Description of the Related Art

Trilateration-based downlink positioning methods, for example, Observed Time Difference of Arrival (OTDOA) in UTRAN, Enhanced Observed Time Difference (E-OTD) in GERAN, and Advanced Forward Link Trilateration (AFLT) in CDMA2000, can be used to determine the position of the UE in relation to a serving cell, for example, an e-UTRAN Node B (eNB) serving the UE.

Neighboring cells, i.e., base stations, mobile stations, etc., can create a significant amount of interference, weakening the signal transmitted between the UE and the eNB and reducing the accuracy of locating the UE in a cellular network. Therefore, trilateration-based downlink positioning methods have been developed and optimized to more accurately determine the position of the UE in relation to the eNB in the cellular network, despite competing interference levels from neighboring cells.

Trilateration-based downlink positioning methods can be used for determining the position of the UE in various applications, for example, in locating an originator of a 9-1-1 emergency call from a mobile station, for example, a wireless telephone. Currently, public safety personnel in the United States estimate that approximately 50% of the 9-1-1 emergency calls that are received daily are placed using wireless telephones. Because of the high volume of 9-1-1 emergency calls placed using wireless telephones, there is a need for increasing the accuracy of determining the position of the UE to timely and accurately locate the individual in need. The Federal Communications Commission (FCC) initiated the "Wireless Enhanced 9-1-1 (E9-1-1) initiative to improve the effectiveness and reliability of wireless 9-1-1 services by providing 9-1-1 dispatchers with additional information on wireless 9-1-1 calls. Under E9-1-1, the FCC requires wireless carriers to provide a local Public Safety Answering Point (PSAP) with the telephone number of the originator of a wireless 9-1-1 call and the location of the cell site or base station transmitting the call. The FCC, under E9-1-1, also requires wireless carriers to provide the position of the wireless telephone originating the 9-1-1 emergency call within 50 meters for 67% of the calls and within 150 meters for 95% of the calls.

SUMMARY

In accordance with an embodiment of the invention, there is provided a method. The method includes estimating, by a mobile node, a plurality of reference signal time differences between the mobile node and a network node. The plurality of reference signal time difference estimates define a first correlator. The method further includes determining, with the first correlator, a second correlator of reference signal time difference estimates, and defining the second correlator with the first correlator based on a mean of the plurality of reference signal time difference estimates. Further, the method includes determining a distribution of the plurality of reference signal time difference estimates, and grouping clusters of reference signal time difference estimates in the distribution. A cluster is selected from the clusters of reference signal time difference estimates. The cluster includes a reference signal time difference estimate corresponding to the earliest estimated timing in the second correlator. The mobile node transmits the cluster to the network node for positioning the mobile node in a communications network.

In accordance with another embodiment of the invention, there is provided an apparatus. The apparatus includes at least one memory including computer program code and at least one processor. The at least one memory and the computer program code are configured to, with the at least one processor, cause the apparatus at least to estimate, by a mobile node, a plurality of reference signal time differences between the mobile node and a network node. The plurality of reference signal time difference estimates define a first correlator. The apparatus further determines, with the first correlator, a second correlator of reference signal time difference estimates, and defines the second correlator with the first correlator based on a mean of the plurality of reference signal time difference estimates. The at least one memory and the computer program code are configured to, with the at least one processor, cause the apparatus at least to determine a distribution of the plurality of reference signal time difference estimates, and group clusters of reference signal time difference estimates in the distribution. The apparatus further selects a cluster from the clusters of reference signal time difference estimates. The cluster includes a reference signal time difference estimate corresponding to the earliest estimated timing in the second correlator. The mobile node transmits the cluster to the network node for positioning the mobile node in a communications network.

BRIEF DESCRIPTION OF THE DRAWINGS

Reference will now be made in detail to the embodiments of the invention, examples of which are illustrated in the accompanying drawings.

DETAILED DESCRIPTION

It will be readily understood that the components of the invention, as generally described and illustrated in the figures herein, may be arranged and designed in a wide variety of different configurations. Thus, the following detailed description of the embodiments of methods, apparatuses, computer programs, and a system, as represented in the attached figures, is not intended to limit the scope of the invention as claimed, but is merely representative of selected embodiments of the invention.

Certain embodiments of the invention combine hardware and software components to create methods, apparatuses, computer programs, and a system for timed estimation-based positioning of a UE in a cellular network. In particular, certain embodiments of the invention provide methods, apparatuses, computer programs, and a system for using a RSTD estimation algorithm for OTDOA to determine the location of a UE in a cellular network.

OTDOA is one of the accepted positioning methods to be used for LTE systems, as defined, for example, in the $3^{rd}$ Generation Partnership Project (3GPP) Release 9, Technical Specification 36.300 "Group Radio Access Network, Evolved Universal Terrestrial Radio Network (E-UTRAN), and Evolved Universal Terrestrial Radio Access Network (E-UTRAN)" (TS 36.300).

Figure 1:
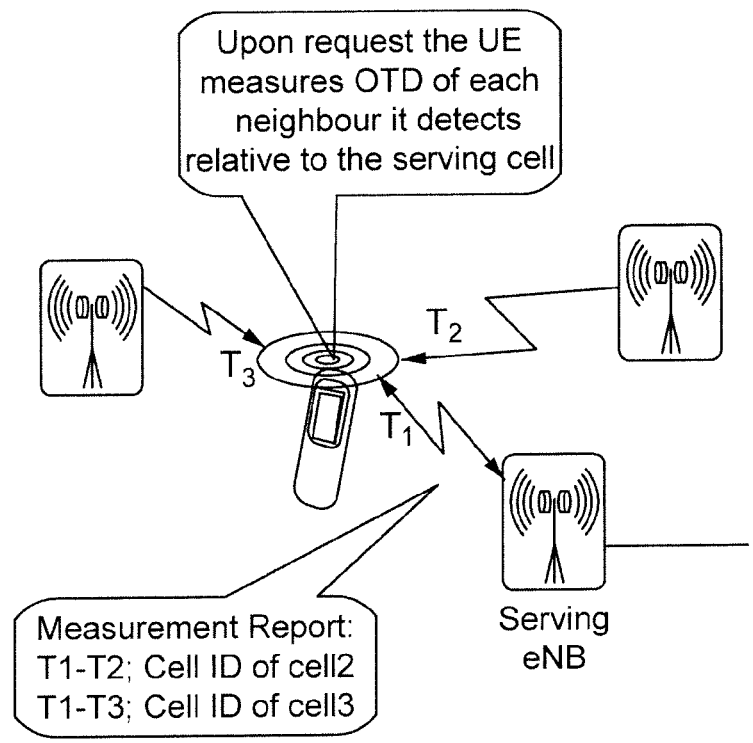
FIG. 1 illustrates an example of a principle of OTDOA in accordance with an embodiment of the invention.

Using OTDOA, the location of a UE can be trilaterated, or triangulated, using the transmit timings and geographic location of other cells in the cellular network. Accurate OTDOA-based positioning can require the UE to report Observed Time Differences (OTD) relative to the serving eNB timing based on accurate measurements of the transmit timing from at least two other, and more preferably four other cells, to the serving eNB, as illustrated in FIG. 1. To enhance the accuracy of determining the position of the UE in the cellular network, the serving eNB can provide target neighbor cell Physical Cell ID (PCI) and other assistance information to the UE.

Figure 2:
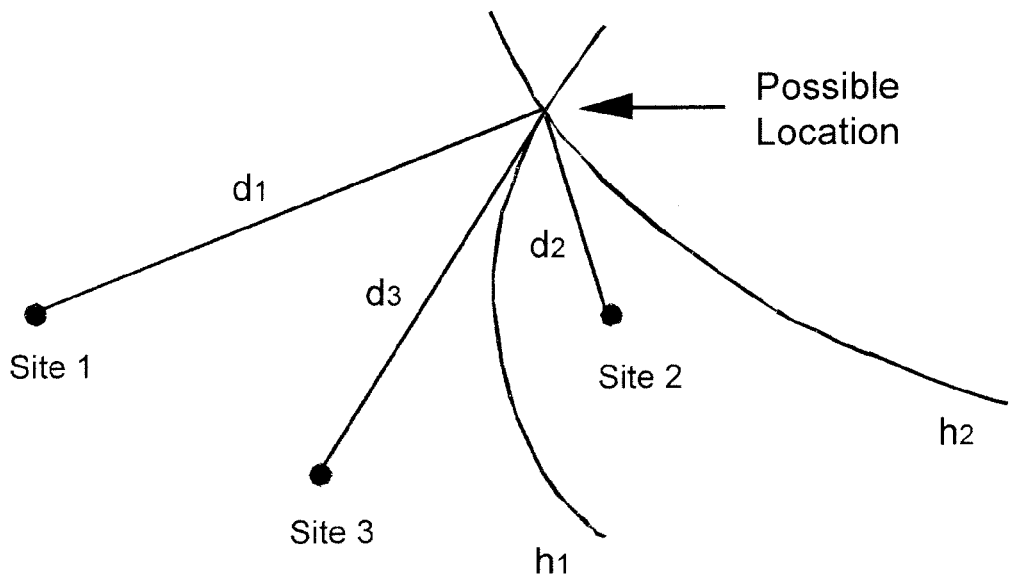
FIG. 2 illustrates another example of a principle of OTDOA in accordance with an embodiment of the invention.

Furthermore, each OTDOA measurement performed by the UE for a pair of downlink transmissions can describe a line of constant difference along which the UE may be located. As illustrated in FIG. 2, the UE's position can be determined by the intersection of these lines for at least two pairs of cells, for example, neighboring base stations. The intersection of these lines, and therefore the position of the UE, can be determined using a trilateration algorithm, for example, by solving a system of equations that are linearized using Taylor series expansion.

Positioning Reference Signal (PRS) patterns with Reference Signal (RS) reuse-6 can be used to determine the position of the UE in the cellular network. Provisional parameters for network assistance for RSTD measurements in the UE, as outlined, for example, in 3GPP TSG RAN WG1 Meeting #58, Shenzhen, China, Aug. 24-28, 2009, can also be used to determine the position of the UE. These provisional parameters can include assistance information that is associated with the configuration of the serving eNB, and assistance information that is associated with the measured cells. These provisional parameters can include, for example, the periodicity of positioning sub-frames, i.e., 16, 32, 64, and 128 radio frames, and the support for time accumulation, i.e., $N_{PRS}$-1, 2, 4, and 6 consecutive positioning sub-frames. These provisional parameters can be used to drive the positioning performance in the trilateration algorithm for determining the position of the UE in the cellular network.

There are a number of hearability issues associated with OTDOA methods. Because the UE-observed RSTD measurement is defined to be based on the PRS, the hearability of RS by the UE is very important. The hearability of RS by the UE can depend on (1) the signal path loss from the UE to the serving eNB, (2) RS re-use factors, (3) RS transmission power, (4) muting of the serving eNB, and (5) interference from neighboring cells. Muting of the serving eNB transmissions during a OTDOA sub-frames can significantly improve the hearability of PRS both for cell-edge users and cell-center users due to dynamic range limitations of the receiver and frequency-domain orthogonality of Common Reference Signals (CRS) and PRS.

Figure 3:
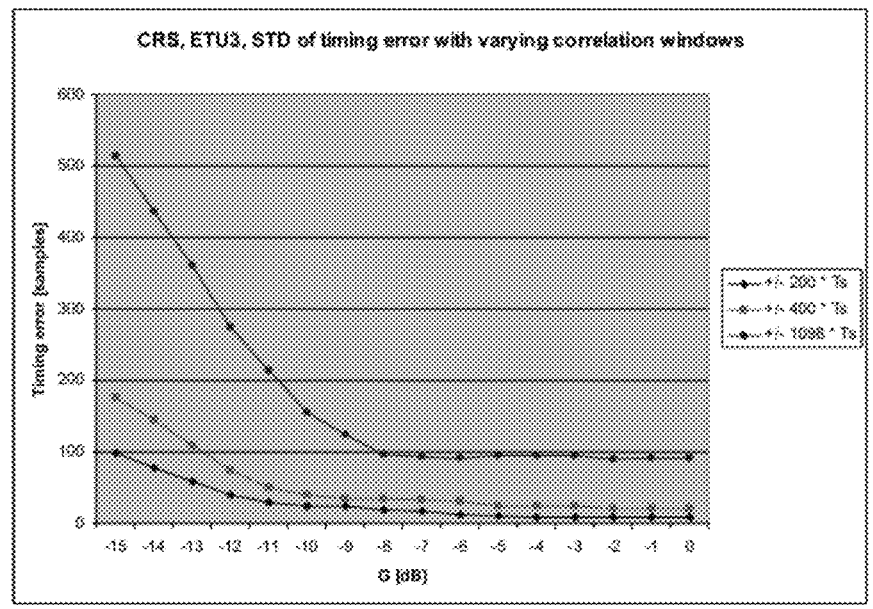
FIG. 3 illustrates the impact of a Reference Signal Time Difference (RSTD) window size on a RSTD timing error in accordance with an embodiment of the invention.

A transmit timing offset and a measured distance between the serving eNB and the measured UE define the RSTD window with which a sliding correlator can be used to determine a RSTD estimate. The larger, i.e., wider, the RSTD window, the more likely the UE is to report false correlation peaks. As a result, the OTDOA positioning performance can become significantly degraded, reducing the accuracy in determining the location of the UE in the cellular network. In some cases, the sliding correlator determines a reliable RSTD estimate obtained over one OTDOA sub-frame, allowing for multipath. As a result, a correlation peak occurs at the strongest path component, however, this path component may not be the shortest Line of Sight (LOS) path. In these cases, relatively small timing errors can be experienced, primarily due to reduced noise or interference from neighboring cells. However, when the sliding correlator incorrectly detects the correct peak, very large timing errors can be experienced based on the size of the RSTD window. Accordingly, as illustrated in FIG. 3, a larger RSTD window represents larger RSTD timing errors, reducing the accuracy in determining the location of the UE in the cellular network.

Thus, OTDOA methods would benefit from a discarding of OTDOA measurements that are clearly erroneous, however the UE would still cause Uplink (UL) overhead with erroneous measurement reports. Even more importantly, the UE cannot take any measures to improve these erroneous OTDOA measurements because it is unaware of the erroneous measurements. Thus, OTDOA methods can experience erroneous OTDOA measurements that cause high path loss and severe multipath propagation. As a result, the use of OTDOA trilateration positioning to determine the location of a UE in a cellular network may not be very accurate. In other words, OTDOA trilateration positioning methods may be unreliable methods for locating a 9-1-1 emergency call from a wireless telephone, for example, for satisfying the requirements of the FCC's E9-1-1 initiative.

To solve the aforementioned problems, OTDOA methods implement coherent combining across PRS symbols with the OTDOA sub-frame to improve the detection performance of the UE. For example, coherent combining across Enhanced Idle Periods in Down Link (E-IPDL), i.e., periods during which transmission of all channels from a base station is ceased, of RS symbols has been performed in an OTDOA sub-frame. As a result, the Signal-to-Noise Ratio (SNR) received at the UE from the serving eNB may be increased through energy accumulation by accumulating correlator output from multiple symbols, and potentially multiple sub-frames.

Furthermore, OTDOA methods have implemented non-coherent combining across PRS-based correlation outputs from different PRS sub-frames to improve the detection performance when a channel is time-varying from sub-frame to sub-frame. Typically, the RSTD from all eNBs are assumed constant, i.e., Time of Arrival coherence time, with a n-OT-DOA sub-frame, but not necessarily over multiple sub-frames depending on UE velocity.

Other OTDOA methods have found that non-coherent averaging over $N_{PRS}$ consecutive OTDOA sub-frames is useful in improving the detection performance of the UE. $N_{PRS}$ could be 1, 2, 4, or 6 for LS-OTDOA. However, in some cases, the RSTD correlator is successful in providing reliable OTDOA positioning within a few samples based on noise and multipath. Whereas, in some cases, the RSTD correlator is unsuccessful, producing timing errors of a few hundred $T_S$ that significantly bias the mean and std of RSTD timing error and resulting in an unreliable OTDOA positioning of the UE in the cellular network.

Certain embodiments of the invention provide a method for determining the RSTD of a direct path between the PRS-transmitting (serving) eNB and the UE. The method can include determining a center of gravity of RSTD estimates using a large sliding correlator window size, rstdWND. The method can further include defining a smaller sliding correlator window size, smallRSTD, based on the determined RSTD estimates, whereby smallRSTD<rstdWND. For example, the smallRSTD can be selected to have a size, or width, that is large, or wide, enough to capture the multipath propagation for the PRS transmissions (direct and reflected paths), and small, or narrow, enough to optimize performance and minimize UE complexity.

The method can further include, after defining the smallRSTD, determining the center of gravity of the RSTD estimates corresponding to a direct path between the eNB and the UE by determining a distribution function of the RSTD estimates. Further, the method can include selecting K RSTD bins with the most occurrences of RSTD estimates, determining the center of each bin, and selecting the bin with the RSTD estimate corresponding to the earliest estimated timing in the smallRSTD as the RSTD estimate to be reported by the UE to the Sending Location Mobile Center (eSLMC) for OTDOA positioning of the UE in the cellular network.

The RSTD estimate corresponding to the earliest estimated timing within the smallRSTD can be observed at a UE detector. This RSTD estimate can correspond to the shortest path form the eNB transmitting the PRS to the UE detecting the PRS. In a multipath propagation, the shortest path can represent the direct path (Line of Site path) and the reflected path. The LOS path has the smallest propagation delay. Preferably, the LOS path is selected. However, there can be cases where the LOS path is not detected at all by the UE detector because of fading or the probability of fading of the LOS path within the OTDOA measurement interval. In this case, the second shortest path can be detected.

For example, assuming an initial rstdWND is +200×Ts, a smallRSTD is set to ±30×Ts, a bin size is one sample (1×Ts), and the OTDOA measurement period includes N=50 OTDOA sub-frames, the distribution function of RSTD estimates can be computed over L=60 bins. The K RSTD bins with the most occurrences of RSTD estimates can be selected for further processing as these bins are assumed to contain the RSTD of direct and reflected paths. The L-K remaining bins can be discarded as they are assumed to represent noise, or contain RSTD estimates far from the direct or reflected paths. From the K RSTD bins, the bin with the RSTD estimate corresponding to the earliest estimated timing in the smallRSTD can be selected as the bin containing the direct path, and therefore containing the RSTD estimate to be reported by the UE to the eSLMC for OTDOA positioning of the UE in the cellular network. Thus, the central RSTD value, $RSTD_{min}$, in the bin is selected as the bin containing the direct path.

Alternatively, only J<K of the RSTD bins contain several occurrences of RSTD estimates, whereby these occurrences are closest to the median value of the K RSTD bins. In this case, only J RSTD bins are selected for determining the bin with RSTD estimates closest to the center of the smallRSTD. The remaining K-J RSTD bins can be discarded.

The method can also include determining the center of gravity of RSTD estimates using the rstdWND for the first $N_C$ OTDOA sub-frames, whereby the UE can narrow the rstdWND for the remaining duration of the OTDOA measurement period. Narrowing the rstdWND in this manner can improve RSTD timing accuracy over the remainder of the OTDOA measurement period, while saving processing power and reducing UE battery consumption. The method can also include determining a probability, Prob $(N_d, N)=N_d/N$, of RSTD estimates falling outside of the smallRSTD to generate a level of confidence of the OTDOA estimate measurement reported by the UE. $N_d$ RSTD estimates falling outside the smallRSTD can also be discarded prior to determining the mean RSTD estimate based on the remaining $N-N_d$ RSTD estimates for the OTDOA measurement period, or alternatively for a smaller RSTD reporting period.

The center of gravity of RSTD estimates can be determined by estimating a mean RSTD estimate, meanRSTD, over the OTDOA measurement period. In some embodiments of the invention, the center of gravity of RSTD estimates can be determined over a small timer interval based on the RSTD reporting period of the UE, or to allow the UE to switch to a more efficient small window processing mode to save processing power, battery consumption, and/or enhance RSTD measurement performance of the UE. Alternatively, the mean of squares of RSTD estimates, meansqRSTD, can be estimated to set the center of gravity of RSTD estimates around direct path peaks and reflected path peaks. Distant peaks can be discarded to improve the level of confidence of the OTDOA estimate measurement reported by the UE.

Preferably, the center of gravity of RSTD estimates can be determined over N RSTD estimates followed by defining the smallRSTD. Then the RSTD estimates can be determined using the smallRSTD to allow PRS received over the remaining OTDOA sub-frames in the OTDOA measurement interval to be used in determining the RSTD estimate to be reported by the UE to the eSLMC for OTDOA positioning of the UE in the cellular network.

Alternatively, all data received over the N OTDOA sub-frames used in determining the center of gravity are buffered so that all the OTDOA sub-frames in the OTDOA measurement interval can be used to determine the RSTD estimate to be reported by the UE.

For example, assuming a periodicity of 160 ms and one OTDOA sub-frame, the meanRSTD or meansqRSTD can be computed over N=50 RSTD measurements. In other example, for two RSTD estimate reports required during the OTDOA measurement period, the center of gravity of the RSTD estimate can be computed over the RSTD reporting period of N=25 RSTD measurements. In a further example, in the case where the UE needs to define the smallRSTD around the center of gravity over a smaller number of RSTD estimates, N, before processing the RSTD estimates for optimal performance, the center of gravity of the RSTD estimate can be computed over the RSTD reporting period of N measurements.

Figure 4:
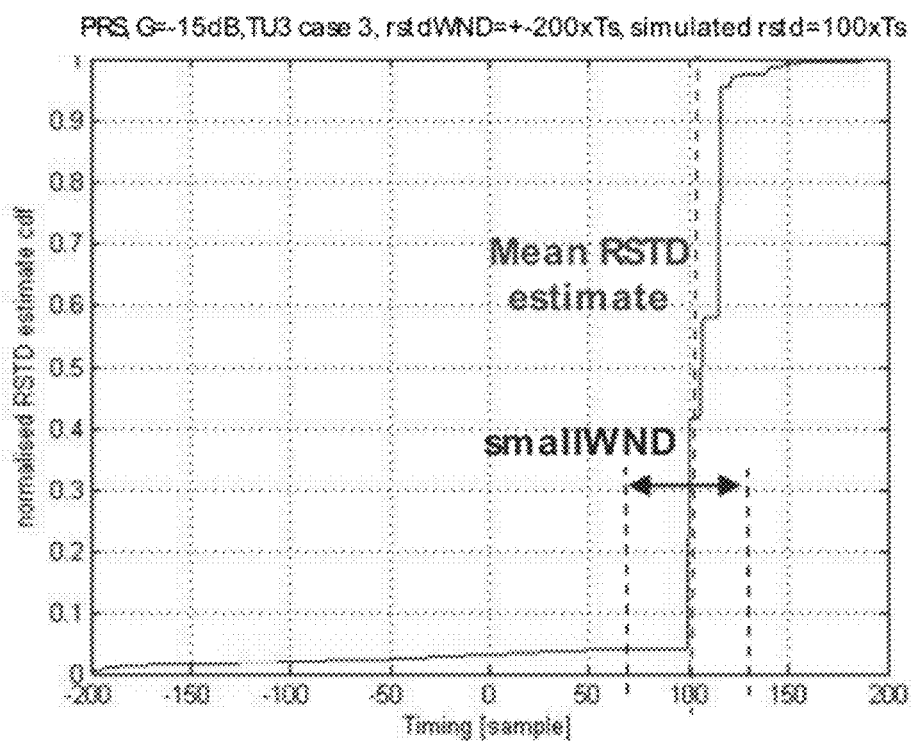
FIG. 4 illustrates a cumulative density function of RSTD estimates in accordance with an embodiment of the invention.

FIG. 4 illustrates a cumulative density function of RSTD estimates in accordance with an embodiment of the invention. In particular, FIG. 4 illustrates a typical urban channel based on a 3GPP TR 25.943 profile RSTS measurements cumulative density function. The cumulative density function is for RSTD estimates obtained over 4000 OTDOA sub-frames with rstdWND=±200×Ts.

The Typical Urban (TU) channel delay taps and power taps can be specified as, for example:

| Delay Taps | 0 | 0.21 | 0.51 | 0.51 | 0.51 | 0.67 | 0.88 | 1.23 | 1.28 | 1.31 | 1.34 |
|---|---|---|---|---|---|---|---|---|---|---|---|
| Power Taps | 0 −5.7 | 6.6 −7.6 | 15.7 −10.1 | 15.8 −10.2 | 15.9 −10.2 | 20.7 −11.5 | 27.1 −13.4 | 37.8 −16.3 | 39.6 −16.9 | 40.3 −17.1 | 41.5 −17.4 |
| Delay Taps | 1.53 | 1.53 | 1.62 | 1.81 | 1.83 | 1.88 | 1.94 | 2.04 | 2.14 [us] | | |
| Power Taps | 47.1 −19 | 47.2 −19 | 49.9 −19.8 | 55.9 −21.5 | 56.4 −21.6 | 57.9 −22.1 | 59.7 −22.6 | 63.0 −23.5 | 65.8 [samples −24.3 [dB] | | |

According to certain embodiments, at a sampling frequency of 30.72 MHz, a sample duration can be approximately 0.0325 us or $d = c \cdot t = 3 \times 10^8 \times 0.0325 \times 10^{-6} = 9.7$ m.

FIG. 4 further illustrates 3 steps, whereby around 100 samples, i.e., simulated timing offset corresponding to the direct path, 106 samples, and 115 samples in the cumulative density function are due to the main multipath components. These values correspond to the correct RSTD measurements of the strongest paths (direct and reflected paths). The remaining portions of the cumulative density function correspond to the incorrect measurements caused, for example, by noise or interference. Hence, the center of RSTD estimates can be centered around the strongest paths. RSTD estimates that are far from this center of RSTD estimates can be discarded. For example, all the RSTD estimates that are from the center of the smallRSTD, as illustrated in FIG. 4, are discarded, reducing the standard deviation of the timing errors.

EXAMPLES

Figure 5:
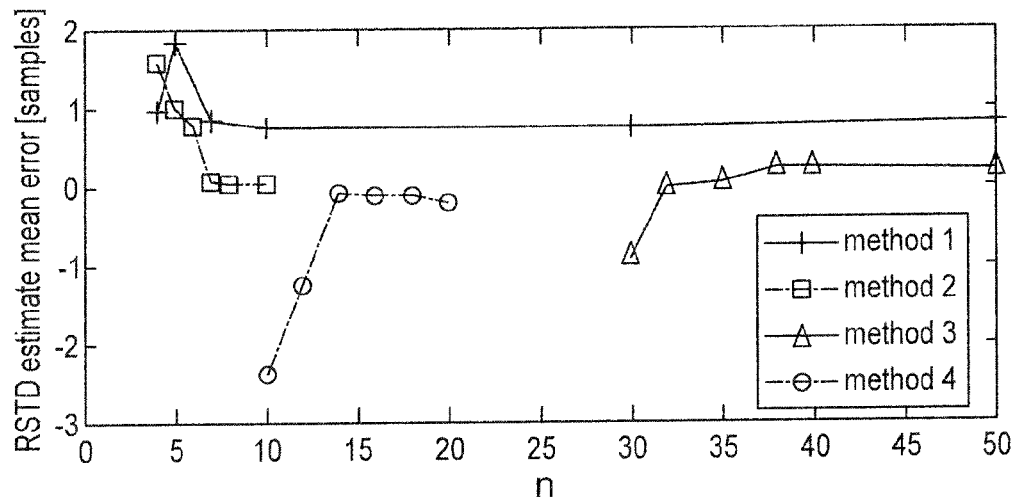
FIG. 5 illustrates a performance of small window centering and MP resolution algorithms in accordance with an embodiment of the invention.
Figure 5:
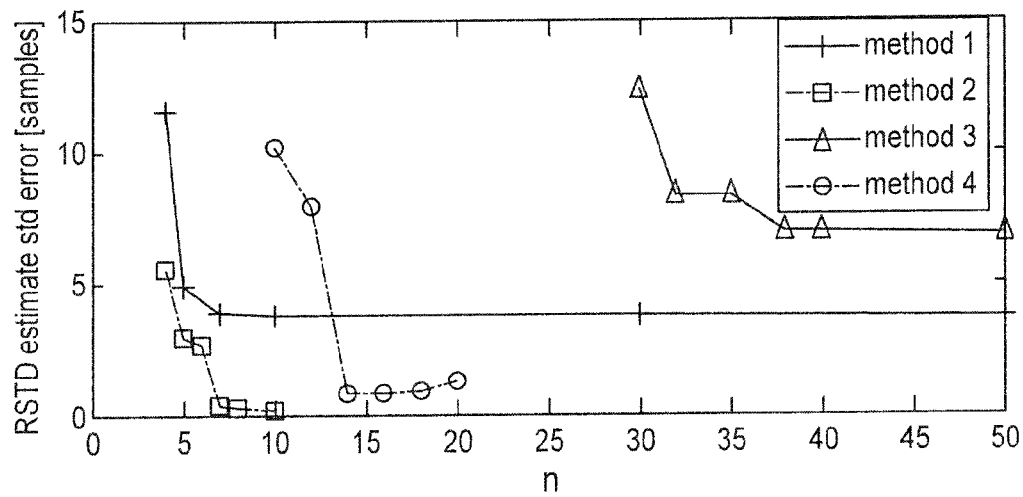
Figure 6:
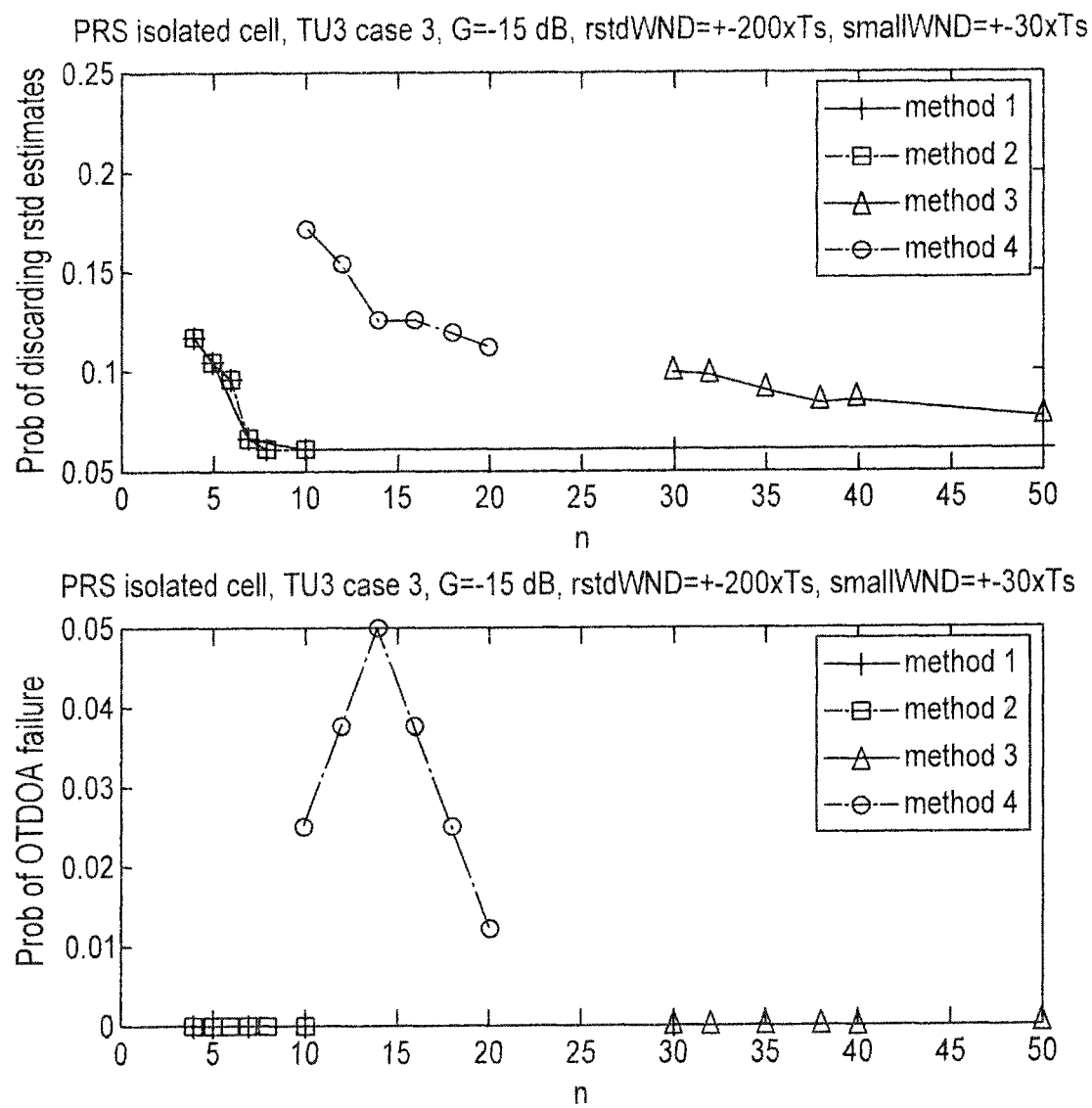
FIG. 6 illustrates a performance of small window centering and MP resolution algorithms in accordance with an embodiment of the invention.

A simulation for various sizes of N was performed to determine the optimum performance with the following parameters and methods:
PRS, Isolated Cell, G=−15 dB, Case 3, TU3
Large sliding correlator window, rstdWND=±200×Ts
Small sliding correlator window, smallRSTD=±30×Ts
Four methods were performed using n RSTD estimates to define the center of the smallRSTD. 50 RSTD estimates were used per OTDOA measurement period. No threshold was used and RSTD estimates falling outside of the smallRSTD are discarded:
Method 1→mean of squares with multipath (MP) selection algorithm
Method 2→mean of squares with MP center of gravity algorithm
Method 3→mean with MP selection algorithm
Method 4→mean with MP center of gravity algorithm
Method 2 provides the best overall results with mean of squares, n=5 RSTD estimates being sufficient for defining the smallRSTD, as illustrated in FIGS. 5 and 6. FIGS. 5 and 6 each illustrate a performance of small window centering and MP resolution algorithms in accordance with embodiments of the invention.

In particular, FIG. 5 illustrates that method 2 achieves mean and standard RSTD errors within the requirements of FCC E9-1-1. In FIG. 5, one sample error is roughly approximate to 10 m error. As illustrated in FIG. 6, the probabilities of discarding RSTD estimates corresponds to the probabilities of RSTD estimates falling outside the smallRSTD in a OTDOA measurement period. The probability of OTDOA failure corresponds to the probability of all RSTD estimates falling outside of the smallRSTD in the OTDOA measurement period. These probabilities are illustrated in FIG. 6, and are sufficiently low for method 2 at n=5, i.e., around 90% valid RSTD estimates in the smallRSTD, and 0% OTDOA failure. The RSTD error is much smaller than that shown in FIG. 2. Additionally, switching to the smallRSTD=±30×Ts compared to the larger rstdWND=±200×Ts reduces processing requirements by at least an order of magnitude.

Figure 7:
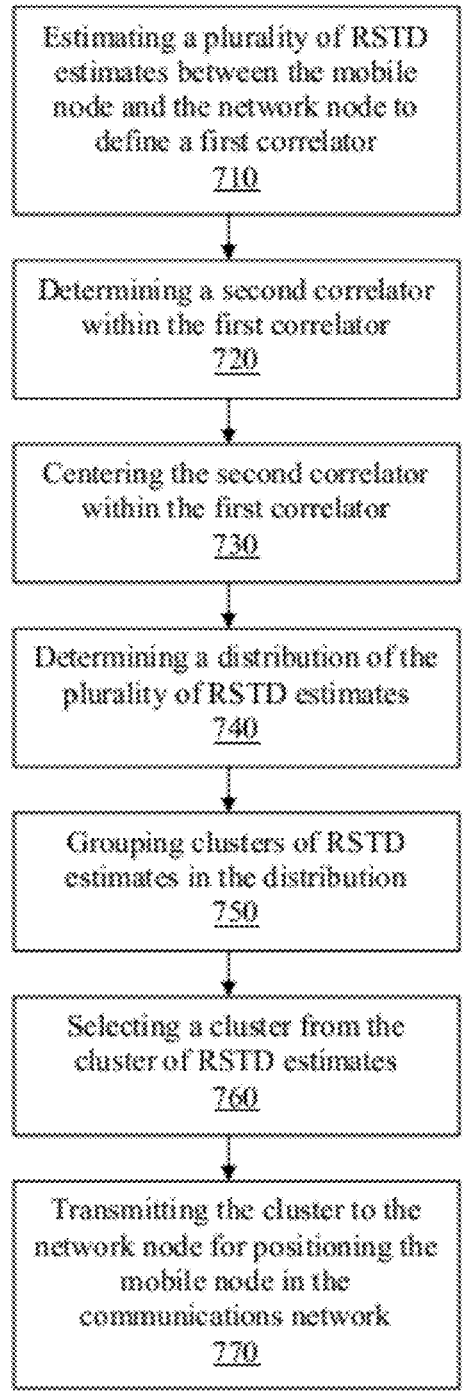
FIG. 7 illustrates a method, in accordance with an embodiment of the invention.

FIG. 7 illustrates a method in accordance with an embodiment of the invention. The method of FIG. 7 includes estimating, by a mobile node, a plurality of RSTD between the mobile node and a network node (step 710). The plurality of RSTD can define a first correlator. In step 720, a second correlator of RSTD, with the first correlator, is determined. In step 730, the second correlator is defined with the first correlator based on a mean of the plurality of RSTD estimates. The method further includes, at step 740, determining a distribution of the plurality of RSTD estimates, and grouping clusters of RSTD estimates in the distribution, at step 750. At step 760, a cluster from the clusters of RSTD estimates is selected. The cluster can include the RSTD estimate corresponding to the earliest estimated timing in the second correlator. Furthermore, the method includes transmitting, by the mobile node, the cluster to the network node for positioning the mobile node in a communications network (step 770).

The second correlator can be smaller than the first correlator. Step 710 can further include determining at least one of a transmit time to the network node and a transmit time to a plurality of neighboring network nodes for estimating the plurality of RSTD between the mobile node and a network node. Furthermore, step 710 can include estimating a mean RSTD over a period of time, or estimating the plurality of RSTD over N observed time difference of arrival sub-frames.

Step 720 can further include determining the second correlator of RSTD estimates during a time period that is a subset of a time period selected to estimate the RSTD for defining the first correlator. Step 730 can further include defining the second correlator based on a mean of squares of the plurality of RSTD.

Step 760 can further include selecting the cluster comprising a RSTD defining a direct path between the mobile node and the network node. Step 770 can further include transmitting the cluster defining an observed time difference of arrival measurement of the mobile node.

The method can further include step 780 for discarding the RSTD estimates located outside of the second correlator in the determined distribution of RSTD estimates. The method can further include step 790 for determining a probability of RSTD estimates located outside of the second correlator to generate a level of confidence of a observed time difference of arrival measurement transmitted by the mobile node to the network node.

It is to be understood that in an embodiment of the invention, the steps and the like may be changed without departing from the spirit and scope of the present invention. In addition, the method described in FIG. 7 may be repeated as many times as needed.

The method of FIG. 7 can be performed by a processor or multiple processors instructed by a computer program or programs embodied on one or more memory device. The processor may be an application specific integrated circuit or it may be a general purpose central processing unit (CPU). The processor of a UE may be configured to perform the method of FIG. 7. The computer program may be transmitted to the processor, directly loaded onto the processor, or may be stored in non-transient memory. The memory, including non-transient memory, may be memory onboard the processor, or may be a separate random access memory (RAM) or other suitable storage device.

The computer program may be composed of modules that are in operative communication with one another, and which are designed to pass information or instructions to a communications device, such as the UE, a personal computer, or handheld device, such as a mobile telephone or personal digital assistant, or their equivalents. The computer program may be configured to operate on a general purpose computer or an application specific integrated circuit (ASIC).

The computer-readable medium may include, for example, a disk media, computer memory, or other storage device.

Figure 8:
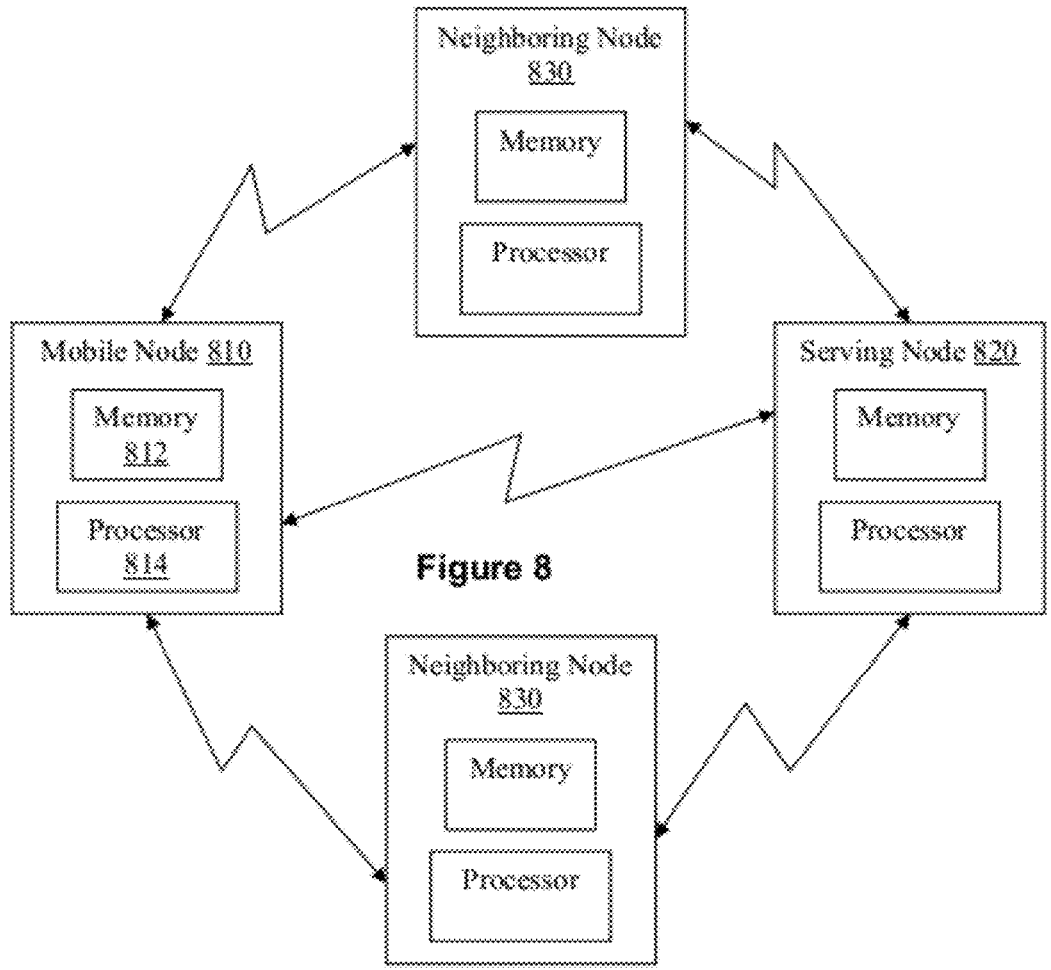
FIG. 8 illustrates a system, in accordance with an embodiment of the invention.

FIG. 8 illustrates a system in accordance with an embodiment of the invention. The system includes a mobile node 810, a serving network node 820, and a plurality of neighboring network nodes 830.

Each of the mobile node 810, the serving network node 820, and the plurality of neighboring network nodes 830 can include at least one memory including computer program code and at least one processor. The at least one memory including computer program code can be configured, with the at least one processor, to perform a set of activities.

Figure 9:
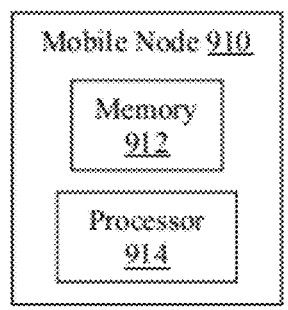
FIG. 9 illustrates an apparatus, in accordance with an embodiment of the invention.

For example, as illustrated in FIG. 9, the mobile node 910 can include at least one memory 912 including computer program code and at least one processor 914. The at least one memory 912 (or memories, which will simply be referred to in the singular form for convenience) and the computer program code of each element can be configured to, with the processor 914 (or processors, which, as with the memory 912, will be referred to in the singular for convenience) of the mobile node 910, cause the mobile node 910 to perform a set of activities.

In particular, the at least one memory 912 and the computer program code are configured to, with the at least one processor 914, can cause the mobile node 910 at least to estimate a plurality of RSTD between the mobile node 910 and the network node. The plurality of RSTD estimates can define a first correlator. They also can cause the mobile node 910 to determine, with the first correlator, a second correlator of RSTD estimates, define the second correlator with the first correlator based on a mean of the plurality of RSTD estimates, and determine a distribution of the plurality of RSTD estimates. The second correlator can be smaller than the first correlator.

Further, they can cause the mobile node 910 to group clusters of RSTD estimates in the distribution, and select a cluster from the clusters of RSTD estimates. The cluster can include the RSTD estimate corresponding to the earliest estimated timing estimate in the second correlator. The at least one memory 912 and the computer program code are configured to, with the at least one processor 914, can further cause the mobile node 910 to transmit the cluster to the network node for positioning the mobile node 910 in a communications network.

The at least one memory 912 and the computer program code are configured to, with the at least one processor 914, can also cause the mobile node 910 at least to determine at least one of a transmit time to the network node and a transmit time to a plurality of neighboring network nodes to estimate the plurality of plurality of RSTD between the mobile node 910 and the network node.

Furthermore, the mobile node 910 can estimate a mean RSTD over a period of time, determine the second correlator of RSTD estimates during a time period that is a subset of a time period selected to estimate the RSTD for defining the first correlator, or define the second correlator based on a mean of squares of the plurality of RSTD.

Furthermore, the mobile node 910 can discard the RSTD estimates located outside of the second correlator in the determined distribution of RSTD estimates, estimate the plurality of RSTD over N observed time difference of arrival sub-frames, to transmit the cluster defining an OTDOA measurement of the mobile node, determine a probability of RSTD estimates located outside of the second correlator to generate a level of confidence of a OTDOA measurement transmitted by the mobile node 910 to the network node.

Accordingly, certain embodiments of the invention provide non-obvious advantages over conventional OTDOA methods. In particular, certain embodiments can reduce issues of false timing measurement reports in scenarios with large path losses and/or low Signal-to-Interference Noise Ratio (SINR) for a UE.

Certain embodiments can reduce the timing uncertainty range, for example, a tested timing candidate, in scenarios where the RSTD window being smaller than the agreed $\pm\frac{1}{2}$ sub-frame reporting range is still found to be too large. The embodiments of the invention enhance the UE's ability to report more reliable timing measurements, hence improving the positioning performance of the UE. As a result, UL capacity is not sacrificed for erroneous measurement reports.

Certain embodiments of the invention also reduce the number of eNBs that are required to provide reliable timing measurement results. For example, only 2-3 eNBs with reuse-3 can be used instead of a minimum of 4 eNBs with reuse=6 or higher as conventionally required in OTDOA systems.

Certain embodiments of the invention also allow for the rapid use of a smaller sliding correlator window centered around an expected RSTD, significantly reducing processing requirements, reducing battery consumption, and providing better performance of RSTD measurements. Furthermore, certain embodiments of the invention effectively manage the multipath environment, significantly improving the RSTD measurement performance of the UE.

One having ordinary skill in the art will readily understand that the invention as discussed above may be practiced with steps in a different order, and/or with hardware elements in configurations which are different than those which are disclosed. Therefore, although the invention has been described based upon these preferred and non-limiting embodiments, it would be apparent to those of skill in the art that certain modifications, variations, and alternative constructions would be apparent, while remaining in the spirit and scope of the invention. Thus, the example embodiments do not limit the invention to the particular listed devices and technologies. In order to determine the metes and bounds of the invention, therefore, reference should be made to the appended claims.

We claim:

1. A method, comprising:
   estimating, by a mobile node, a plurality of reference signal time differences between the mobile node and a network node, wherein the plurality of reference signal time difference estimates define a first correlator;
   determining, with the first correlator, a second correlator of reference signal time difference estimates;
   defining the second correlator with the first correlator based on a mean of the plurality of reference signal time difference estimates;
   determining a distribution of the plurality of reference signal time difference estimates;
   grouping clusters of reference signal time difference estimates in the distribution;
   selecting a cluster from the clusters of reference signal time difference estimates, wherein the cluster comprises a reference signal time difference estimate corresponding to the earliest estimated timing in the second correlator; and
   transmitting, by the mobile node, the cluster to the network node for positioning the mobile node in a communications network.

2. The method of claim 1, wherein the second correlator is smaller than the first correlator.

3. The method of claim 1, wherein the estimating comprises determining a transmit time to the network node.

4. The method of claim 1, wherein the estimating comprises determining a transmit time to a plurality of neighboring network nodes.

5. The method of claim 1, wherein the estimating comprises estimating a mean reference signal time difference over a period of time.

6. The method of claim 1, wherein the determining the second correlator comprises determining the second correlator of reference signal time difference estimates during a time period that is a subset of a time period selected to estimate the reference signal time differences for defining the first correlator.

7. The method of claim 1, wherein the defining comprises defining the second correlator based on a mean of squares of the plurality of reference signal time differences.

8. The method of claim 1, further comprising:
   discarding the reference signal time difference estimates located outside of the second correlator in the determined distribution of reference signal time difference estimates.

9. The method of claim 1, wherein the selecting comprising selecting the cluster comprising a reference signal time difference defining a direct path between the mobile node and the network node.

10. The method of claim 1, wherein the estimating comprises estimating the plurality of reference signal time differences over N observed time difference of arrival sub-frames.

11. The method of claim 1, wherein the transmitting comprises transmitting the cluster defining an observed time difference of arrival measurement of the mobile node.

12. The method of claim 1, further comprising:
    determining a probability of reference signal time differences estimates located outside of the second correlator to generate a level of confidence of an observed time difference of arrival measurement transmitted by the mobile node to the network node.

13. An apparatus, comprising:
    at least one memory including computer program code; and
    at least one processor,
    wherein the at least one memory and the computer program code are configured to, with the at least one processor, cause the apparatus at least to:
    estimate, by a mobile node, a plurality of reference signal time differences between the mobile node and a network node, wherein the plurality of reference signal time difference estimates define a first correlator;
    determine, with the first correlator, a second correlator of reference signal time difference estimates;
    define the second correlator with the first correlator based on a mean of the plurality of reference signal time difference estimates;
    determine a distribution of the plurality of reference signal time difference estimates;
    group clusters of reference signal time difference estimates in the distribution;
    select a cluster from the clusters of reference signal time difference estimates, wherein the cluster comprises the reference signal time difference estimate corresponding to the earliest estimated timing in the second correlator; and
    transmit, by the mobile node, the cluster to the network node for positioning the mobile node in a communications network.

14. The apparatus of claim 13, wherein the second correlator is smaller than the first correlator.

15. The apparatus of claim 13, wherein the at least one memory and the computer program code are further configured to, with the at least one processor, cause the apparatus to determine at least one of a transmit time to the network node and a transmit time to a plurality of neighboring network nodes to estimate the plurality of plurality of reference signal time differences between the mobile node and a network node.

16. The apparatus of claim 13, wherein the at least one memory and the computer program code are further configured to, with the at least one processor, cause the apparatus at least to estimate a mean reference signal time difference over a period of time.

17. The apparatus of claim 13, wherein the at least one memory and the computer program code are further configured to, with the at least one processor, cause the apparatus at least to determine the second correlator of reference signal time difference estimates during a time period that is a subset of a time period selected to estimate the reference signal time differences for defining the first correlator.

18. The apparatus of claim 13, wherein the at least one memory and the computer program code are further configured to, with the at least one processor, cause the apparatus at least to define the second correlator based on a mean of squares of the plurality of reference signal time differences.

19. The apparatus of claim 13, wherein the at least one memory and the computer program code are further configured to, with the at least one processor, cause the apparatus at least to discard the reference signal time difference estimates located outside of the second correlator in the determined distribution of reference signal time difference estimates.

20. The apparatus of claim 13, wherein the at least one memory and the computer program code are further configured to, with the at least one processor, cause the apparatus at least to estimate the plurality of reference signal time differences over N observed time difference of arrival sub-frames.

21. The apparatus of claim 13, wherein the at least one memory and the computer program code are further configured to, with the at least one processor, cause the apparatus at least to transmit the cluster defining an observed time difference of arrival measurement of the mobile node.

22. The apparatus of claim 13, wherein the at least one memory and the computer program code are further configured to, with the at least one processor, cause the apparatus at least to determine a probability of reference signal time differences estimates located outside of the second correlator to generate a level of confidence of an observed time difference of arrival measurement transmitted by the mobile node to the network node.

* * * * *